(12) United States Patent
Heischkel et al.

(10) Patent No.: US 6,790,909 B2
(45) Date of Patent: Sep. 14, 2004

(54) GRAFT COPOLYMERS, THEIR PREPARATION AND THEIR USE

(75) Inventors: Yvonne Heischkel, Mannheim (DE); Nicolas Stöckel, Grünstadt (DE); Philipp Wieland, München (DE); Marcus Schäfer, Krefeld (DE); Oskar Nuyken, München (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/617,860

(22) Filed: Jul. 14, 2003

(65) Prior Publication Data

US 2004/0024145 A1 Feb. 5, 2004

(30) Foreign Application Priority Data

Jul. 16, 2002 (DE) .......................................... 102 32 299

(51) Int. Cl.[7] ..................... C08G 81/02; C08F 212/08; C08F 12/08
(52) U.S. Cl. ................... 525/104; 525/105; 525/193; 525/263; 525/273; 525/333.3; 525/333.4; 525/227; 525/359.1; 525/359.6; 526/292.6; 524/458; 524/567; 524/577
(58) Field of Search ................... 525/104, 105, 525/193, 263, 273, 333.3, 333.4, 227, 359.1, 359.6; 526/292.6; 524/458, 567, 577

(56) References Cited

U.S. PATENT DOCUMENTS 6,506,836 B1 * 1/2003 Bremser et al. .............. 525/64
2003/0018137 A1   1/2003 Ratether

FOREIGN PATENT DOCUMENTS

| CA | 2355252 | 6/2000 |
|---|---|---|
| DE | 19961 063 | 7/2001 |
| WO | 00/37507 | 6/2000 |

OTHER PUBLICATIONS

Bertin et al., Polymer Bull. 1996,37, 337–344.

* cited by examiner

Primary Examiner—James J. Seidleck
Assistant Examiner—Olga Asinovsky
(74) Attorney, Agent, or Firm—Keil & Weinkauf

(57) ABSTRACT

The invention relates to a process for preparing a reaction product (RP) which is functionalized by groups containing halogen or sulfonyl chloride by reaction of at least one free-radically polymerizable monomer, at least one compound of the formula (I),

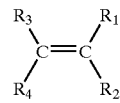

at least one free-radical initiator and at least one free-radically polymerizable monomer containing halogen or sulfonyl chloride groups under free-radical conditions, and to a reaction product (RP) which can be prepared by the process of the present invention and to the use of the reaction product (RP) as macroinitiator for the preparation of graft copolymers. Furthermore the invention relates to a process for preparing graft copolymers by reaction of the reaction product (RP) with at least one suitable monomer and to graft copolymers which can be prepared by the process of the present invention and also to the use of the graft copolymers of the present invention.

12 Claims, No Drawings

GRAFT COPOLYMERS, THEIR PREPARATION AND THEIR USE

The present invention relates to a process for preparing a functionalized reaction product (RP) by reaction under free-radical conditions and also to the functionalized reaction product itself and to its use as macroinitiator for the preparation of graft copolymers. Furthermore, the present invention relates to a process for preparing graft copolymers by reaction of the reaction product (RP), to graft copolymers which can be prepared by this process and to the use of the graft copolymers which can be prepared according to the present invention.

Graft copolymers are target structures which are steadily increasing in importance in polymer chemistry. Such polymers are suitable for numerous applications, in particular for use in polymer mixtures to match the properties, of these mixtures to a desired property profile. There are various methods for preparing graft copolymers. One of the most efficient ways of preparing defined graft copolymers is the preparation of graft copolymers by grafting from a defined macroinitiator onto which suitable monomers are grafted by cationic polymerization.

A large number of macroinitiators which are suitable for free-radical or ionic polymerization and have been prepared by virtually all possible polymerization techniques is known from the prior art. However, a difficulty is the introduction of, for example, initiator functions suitable for cationic polymerization into the macroinitiator. Examples of such interesting initiator functions are groups containing halogen or sulfonyl chloride. However, the preparation of defined macroinitiators functionalized by the functional groups mentioned by customary free-radical polymerization processes is problematical, since these initiator functions have a strong transfer tendency and are also reactive toward anionic catalysts or transition metal catalysts. Various approaches to solutions to this problem are known from the prior art.

Thus, Bertin et al., Polymer Bull 1996, 37, 337, describe the controlled free-radical polymerization (CRP) of 4-vinylbenzyl chloride. (CMS) using TEMPO and its copolymerization with styrene. However, the use of TEMPO is restricted to styrene derivatives since TEMPO is not suitable for the polymerization or copolymerization of polar monomers such as methyl methacrylate (MMA).

ATRP (atom transfer radical polymerization) is also unsuitable for preparing the desired macroinitiators functionalized by groups containing halogen or sulfonyl chloride, since halogen-containing monomers are themselves initiators for the ATRP.

Furthermore, controlled free-radical polymerization in the presence of diphenylethene (DPE) or its derivatives is known from the prior art.

WO 00/37507 relates to a process for preparing a reaction product (A), which comprises the step (i):
(i) reaction under free-radical conditions of a reaction mixture comprising at least one free-radically reactable monomer (a) in the presence of at least one free-radial initiator and a compound of the formula

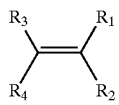

where $R_1$ to $R_4$ are each independently of one another, hydrogen, an in each case unsubstituted or substituted alkyl radical cycloalkyl radical or aralkyl radical or an unsubstituted or substituted aromatic hydrocarbon radical, with the proviso that at least two of $R_1$ to $R_4$ are unsubstituted or substituted aromatic hydrocarbon radicals, in an aqueous phase, and also to a process for preparing a polymer using this reaction product. Reaction products which bear groups containing halogen or sulfonyl chloride and are thus suitable as macroinitiators, in particular for cationic polymerization, are not disclosed. DE-A 199 61 063 relates to a process for preparing a reaction product (A), which comprises the step (i):
(i) reaction under free-radical conditions of a reaction mixture comprising at least one free-radically reactable monomer (a) in the presence of at least one -free-radical initiator and a compound of the formula

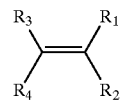

where $R_1$ to $R_4$ are each, independently, of one another, hydrogen, an unsubstituted or substituted alkyl radical, cycloalkyl radical or aralkyl radical or an unsubstituted or substituted aromatic hydrocarbon radical, with the proviso that at least two of the radicals $R_1$ to $R_4$ are unsubstituted or substituted aromatic hydrocarbon radicals, or the radicals $R_1$ and $R_2$ or $R_3$ and $R_4$ in each case in pairs form a substituted or unsubstituted aromatic hydrocarbon having from 6 to 18 carbon atoms and bearing a functional group which has a multiple bond between a carbon atom and a heteroatom which is conjugated with the C—C double bond in the formula I, where 10% by weight or less of water is present in the reaction mixture during the reaction.

DE-A 199 61 063 also relates to a process for preparing a polymer using the reaction product (A). This patent application, too, does not disclose any reaction products bearing groups containing halogen or sulfonyl chloride.

It is an object of the present invention to provide a process for preparing reaction products functionalized by groups containing halogen or sulfonyl chloride, with monomers containing halogen or sulfonyl chloride being able to be incorporated into the polymers without the groups containing halogen or sulfonyl chloride being lost in the process, so as to give polymers bearing groups which contain halogen or sulfonyl chloride and are suitable as initiator function. Such polymers have a great potential for numerous applications.

We have found that this object is achieved by a process for preparing a reaction product (RP) functionalized by groups containing halogen or sulfonyl chloride by reaction of the following components under free-radical conditions:
a) at least one free-radically polymerizable monomer as component (A),
b) at least one compound of the formula (I) as component (B)

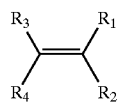

where $R_1$ to $R_4$ are each, independently of one another, hydrogen, an in each case unsubstituted or substituted alkyl radical, cycloalkyl radical or an aralkyl radical or an unsubstituted or substituted aromatic hydrocarbon radical, with the proviso that at least two of the radicals $R_1$ to $R_4$ are unsubstituted or substituted aromatic hydrocarbon radicals or the radicals $R_1$ and $R_2$ or $R_3$ and $R_4$ in each case in pairs form a substituted or unsubstituted aromatic hydrocarbon having from 6 to 18 carbon atoms and bearing a functional group which has a multiple bond between a carbon atom and a heteroatom which is conjugated with the C—C double bond in the formula (I), c) at least one free-radical initiator as component (C), d) at least one free-radically polymerizable monomer containing halogen or sulfonyl chloride groups as component (D).

A further object of the invention is to provide a process for preparing defined graft copolymers.

We have found that this object is achieved by a process for preparing graft copolymers by reaction of a reaction product (RP) as defined in the present patent application with at least one suitable monomer (component (E)). This reaction is preferably a cationic polymerization.

Component A

For the purposes of the process of the present invention, it is possible to use all free-radically reactable monomers as monomers (component A).

For example, free-radically homopolymerizable or copolymerizable compounds which bear a hydrophilic group, e.g. a carboxyl group, can be used as monomers (component A). In this case, the monomers (component A) are hydrophilic, free-radically homopolymerizable or copolymerizable monomers, i.e. monomers whose solubility in water is higher than that of styrene.

Of course, it is also possible to use mixtures of various hydrophilic monomers as monomers (component A) for the purposes of the present invention.

However, in a further embodiment of the present invention, it is also possible to use free-radically polymerizable monomers which have a solubility in water which corresponds to or is lower than that of styrene.

Furthermore, mixtures of at least one hydrophilic monomer and at least one hydrophobic monomer can also be polymerized by the process of the present invention. Specific examples of monomers (component A) are:

$C_1$–$C_{20}$-alkyl and hydroxyalkyl esters of monoethylenically unsaturated $C_3$–$C_{10}$-monocarboxylic acids or $C_4$–$C_8$-dicarboxylic acids, for example methyl methacrylate, ethyl methacrylate, propyl methacrylate (all isomers), butyl methacrylate (all isomers), 2-ethylhexyl methacrylate, isobornyl methacrylate, methyl acrylate, ethyl acrylate, propyl acrylate (all isomers), butyl acrylate (all isomers), 2-ethylhexyl acrylate, isobornyl acrylate, benzyl acrylate, phenyl acrylate, stearyl acrylate, diethyl maleate, hydroxyethyl acrylate, hydroxypropyl acrylate, hydroxybutyl acrylate, also (meth)acrylic esters of alkoxylated $C_1$–$C_{15}$-alcohols which have been reacted with from 2 to 50 mol of ethyleneoxide, propylene oxide, butylene oxide or mixtures thereof; benzyl methacrylate, phenyl methacrylate, stearyl methacrylate, methacrylonitrile, styrene, α-methylstyrene, acrylonitrile, functionalized methacrylates; acrylates and styrenes selected from among glycidyl methacrylate, 2-hydroxyethyl methacrylate, hydroxypropyl methacrylate (all isomers), hydroxybutyl methacrylate (all isomers), diethylaminoethyl methacrylate, triethylene glycol methacrylate, itaconic anhydride, itaconic acid glycidyl acrylate, 2-hydroxyethyl methacrylate, diethylaminoethyl acrylate, triethylene glycol acrylate, methacrylamide, N-tert-butylmethacrylamide, N-n-butylmethacrylamide, N-methylolmethacrylamide, N-ethylolmethacrylamide, N-tert-butylacrylamide, N-butylacrylamide, N-methylolacrylamide, N-ethylolacrylamide, vinylbenzoic acid (all isomers), diethylaminostyrene (all isomers), α-methylvinylbenzoic acid (all isomers), diethylamino-α-methylstyrene (all isomers), p-methylstyrene, p-vinylbenzenesulfonic acid, trimethoxysilylpropyl methacrylate, triethoxysilylpropyl methacrylate, tributoxysilylpropyl methacrylate, diethoxymethylsilylpropyl methacrylate, dibutoxymethylsilylpropyl methacrylate, diisopropoxymethylsilylpropyl methacrylate dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropylacrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate vinyl acetate and vinyl butyrate, vinyl chloride, vinyl fluoride, vinyl bromide, vinyl alcohol, vinyl ethers of $C_1$–$C_{18}$-alcohols, vinyl ethers of alkoxylated $C_1$–$C_{18}$-alcohols and vinyl ethers of polyalkylene oxides such as polyethylene oxide, polypropylene oxide or polybutylene oxide, monoethylenically unsaturated $C_3$–$C_{10}$-monocarboxylic acids, their alkali metal salts and/or ammonium salts, for example acrylic acid, methacrylic acid, dimethylacrylic acid, ethylacrylic acid, allylacetic acid or vinylacetic acid, also monoethylenically unsaturated $C_4$–$C_8$-dicarboxylic acids, their monoesters anhydrides, alkali metal salts and/or ammonium salts, for example maleic acid, fumaric acid, itaconic acid, mesaconic acid, methylenemalonic acid, citraconic acid, maleic anhydride, itaconic anhydride or methylmalonic anhydride; also monoethylenically unsaturated monomers containing sulfonic acid groups, for example allylsulfonic acid, styrenesulfonic acid 2 acrylamido-2-methylpropanesulfonic acid, methallylsulfonic acid, vinylsulfonic acid, 3-sulfopropyl acrylate or 3-sulfopropyl methacrylate, also monoethylenically unsaturated monomers containing phosphonic acid groups, for example vinylphosphonic acid allylphosphonic acid or acrylamidoethylpropanephosphonic acid, also amides and N-substituted amides of monoethylenically unsaturated $C_3$–$C_{10}$-monocarboxylic acids or $C_4$–$C_8$-dicarboxylic acids, for example acrylamide, N-alkylacrylamides or N,N-dialkylacrylamides each having from 1 to 18 carbon atoms in the alkyl group, e.g. N-methylacrylamide, N,N-dimethylacrylamide, N-tert-butylacrylamide or, N-octadecylacrylamide, N-monomethylhexylmaleamide, N-monodecylmaleamide, diethylaminopropylmethacrylamide or acrylamidoglycolic acid; also alkylaminoalkyl (meth)acrylates, for example dimethylaminoethyl acrylate, dimethylaminoethyl methacrylate, ethylaminoethyl acrylate, diethylaminoethyl methacrylate, dimethylaminopropyl acrylate or dimethylaminopropyl methacrylate: also vinyl esters such as vinyl formate, vinyl acetate or vinyl propionate, with these also being able to be present in saponified form after the polymerization; also N-vinyl compounds such as N-vinylpyrrolidone, N-vinylcaprolactam, N-vinylformamide, N-vinyl-N-methylformamide, 1-vinylimidazole or 1-vinyl-2-methylimidazole; also vinyl ethers of $C_1$–$C_{18}$-alcohols, vinyl ethers of alkoxylated $C_1$–$C_{18}$-alcohols and vinyl ethers of polyalkylene oxides such as polyethylene oxide, polypropylene oxide or polybutylene oxide, styrene or its derivatives such as α-methylstyrene, indene, dicyclopentadiene, monomers bearing amino or imino groups, e.g. dimethylaminoethyl methacrylate, diethylaminoethyl acrylate diethylaminopropylmethacrylamide or allylamine, monomers bearing quaternary ammonium groups, e.g. in the form of salts as are obtained by reaction of the basic amino functions with acids such as hydrochloric acid, sulfuric acid, nitric acid, formic acid or acetic acid or in quaternized form (examples of suitable quaternization agents are dimethyl sulfate, diethyl sulfate, methyl chloride, ethyl chloride or benzyl chloride), e.g. dimethylaminoethyl acrylate hydrochloride, diallyldimethylammonium chloride, trimethylammonioethyl acrylate chloride, dimethylaminoethylaminopropylmethacrylamide methosulfate, vinylpyridinium salts or 1-vinylimidazolium salts; monomers in which the amino groups and/or ammonium groups are set free only after the polymerization and subsequent hydrolysis, for example N-vinylformamide or N-vinylacetamide, and also mixtures of two or more of the abovementioned monomers.

In a preferred embodiment, styrene, acrylic or methacrylic acid, a $C_{1-10}$-alkyl, preferably $C_1$–$C_4$-alkyl or -hydroxyalkyl acrylate; or methacrylate, particularly preferably methyl methacrylate (MMA), vinyl acetate, a substituted or unsubstituted vinylpyrrolidone or a mixture of two or more of the monomers mentioned is used as a first monomer (component A). Very particular preference is given to using a mixture of styrene and MMA.

Component B

As component (B), use is made of a compound of the formula (I)

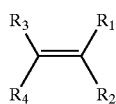

(I)

where $R_1$ to $R_4$ are as defined above. For the purposes of the present invention, a "heteroatom" is an atom other than carbon which is capable of forming multiple bonds (double or triple bonds) with a carbon atom.

In a preferred embodiment of the invention, 1,1-diphenylethene, alkoxydiphenylethylene, 1,1-dinaphthylethene, 4,4-vinylidenebis(N,N'-dimethylaniline), 4,4-vinylidenebis(1-aminobenzene), cis-stilbene, trans-stilbene, methyl α-phenylacrylate, methyl α-phenylmethacrylate, α-phenylacrylonitrile, α-phenylmethacrylonitrile or a mixture of two or more thereof is used as compound of the formula (I). Particular preference is given to using 1,1-diphenylethene as compound of the formula (I).

Further compounds which are likewise suitable as compound of the formula (I) are substituted diphenylethenes which are substituted, by electron-withdrawing or electron-donating substituents, e.g. tert-butyl, benzyl or CN groups, on either one or both aromatic hydrocarbon radicals, or alkoxydiphenylethylenes such as methoxydiphenylethylene ethoxydiphenylethylene or tert-butyloxydiphenylethylene, and also the analogous thio or amino compounds.

Component C

The process of the present invention is carried out in the presence of at least one free-radical initiator, with oxidizing free-radical initiators being preferred here. The initiator is preferably soluble in the solvent used or at least in the monomers used for the polymerization. However, it is generally possible to use all azo and/or peroxo compounds customarily used in free-radical chain polymerization.

Suitable initiators are described in WO 98/01,478 on page 10, lines 17–34, which is hereby fully incorporated by reference into the present patent application.

Very particular preference is given to using AIBN or benzoyl peroxide as free-radical initiators In a preferred embodiment of the process of the present invention, a comparatively large amount of the free-radical initiator is added, with the proportion of free-radical initiator in the reaction mixture preferably being from 0.5 to 20% by weight, particularly preferably from 1 to 10% by weight, in each case based on the total amount of the components (A), (B) and (D). The ratio of initiator to compound of the formula (I) is preferably from 3:1 to 1:3, more preferably from 2:1 to 1:2 and in particular from 1.5:1 to 1:1.5.

Component D

As component D, use is made, according to the present invention, of a free-radically polymerizable monomer which is halogenated or contains sulfonyl groups.

Preference is given to using 2-chloropropene or a monomer of the formula (II):

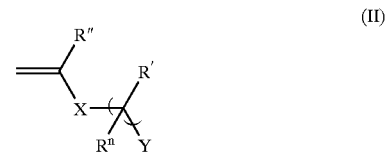

(II)

where

X is a singe bond or a substituted or unsubstituted arylene radical, preferably an arylene radical substituted by from 1 to 4 alkyl groups preferably $C_1$–$C_{10}$-alkyl groups, or a phenylene radical or a substituted or unsubstituted alkylene radical, preferably a $C_2$–$C_4$-alkylene radical, which may be substituted by one or more alkyl groups, preferably $C_1$–$C_5$-alkyl groups, or a radical of the formula

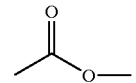

particularly preferably an arylene radical substituted by from one to 4 $C_1$–$C_{10}$-alkyl groups, a phenylene radical or a radical of the formula

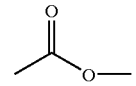

very particularly preferably a phenylene radical;

R, R' and R" are each hydrogen or a $C_1$–$C_5$-alkyl radical, preferably methyl, ethyl or hydrogen, very particularly preferably hydrogen or methyl;

n is from 1 to 3, preferably 1, and

Y is a halogen radical, preferably Cl, or a sulfonyl chloride radical.

The component (D) is very particularly preferably 2-chloropropene or a compound of the formula (II) selected from the group consisting of 4-(chloromethyl)styrene (CMS).

Preference is given to using from 30 to 98.9% by weight, preferably from 60 to 97.5% by weight, of the component (A), from 0.1 to 20% by weight, preferably from 0.5 to 10% by weight, of the component (B), from 1 to 50% by weight, preferably from 2 to 30% by weight, particularly preferably from 5 to 25% by weight, of the component (D), where the sum of the components (A) (B) and (D) is 100% by weight, and from 0.5 to 20% by, weight, preferably from 1 to 10% by weight, of the component (C), based on the sum of the components (A) (B) and (D), in the process of the present invention.

The process of the present invention can be carried out in an organic solvent or in the absence of solvent ("in bulk"), in the presence or absence of water, or in an aqueous phase. In a preferred embodiment of the present invention, the process of the present invention is carried out in an organic solvent.

As solvents in the process of the present invention, it is in principle possible to use all polar and nonpolar organic solvents in which the respective components and preferably also the polymers formed are soluble, if appropriate at elevated temperature. Suitable solvents are, for example. $C_3$–$C_{10}$-alkanes, cyclohexane, decalin, acetone, methyl ethyl ketone, diisobutyl ketone, tetrahydrofuran, dioxane, benzene, toluene, glycols such as ethylene glycol, triethylene glycol, partially or completely end-group-capped glycol ethers such as ethylene glycol monomethyl ether, ethyl acetate, methanol, or ethanol or the higher homologues of alkanols having up to 18 carbon atoms (if appropriate as cosolvent) or mixtures of two or more thereof. Particular preference is given to using toluene as solvent.

The process of the present invention is generally carried out at temperatures above room temperature and below the decomposition temperature of the monomers, preferably in a temperature range from 50 to 150° C., particularly preferably from 60 to 120° C. and very particularly preferably from 70 to 110° C.

The process of the present invention is generally earned out at pressures of from 1 to 300 bar, preferably from 1.5 to 100 bar, particularly preferably from 2 to 20 bar The number average molecular weight (Me; determined by means of gel permeation chromatography (GPC)) of the reaction products (RP) which can be prepared by the process of the present patent application is generally, from 500 to, $10^6$, preferably from 1000 to $5\times10^5$, particularly preferably from 2000 to $10^5$.

The molecular weights of the reaction product (RP) can be controlled within wide limits by choice of the ratio of monomers (components A and D) to compounds (I) (component B) to the free-radical initiator (component C). Here, the content of compound (I), in particular, determines the molecular weight, with the molecular, weights obtained decreasing as the proportion of compound (I) increases.

Although there are no restrictions in respect of the molecular weight distribution, a reaction product (RP) having a molecular weight distribution (polydispersity index, PDI ($M_w/M_n$), where $M_n$ is the number average molecular weight and $M_w$ is the weight average molecular weight) measured by means of gel permeation chromatography using polystyrene as standard of 4, preferably 3, more preferably 2, in particular 1.7 and in some cases even 1.3, can be obtained in the process of the present invention.

The procedures for carrying out the free-radical polymerization and suitable apparatuses are known to those skilled in the art.

In a preferred embodiment the process of the present invention comprises the following steps:
(i) reaction of the components (A), (B) and (C) under free-radical conditions to form a reaction product (RP');
(ii) reaction of the reaction product (RP') with the component (D) and, if desired, further free-radically polymerizable monomers (component (A)) which are different from the free-radically polymerizable monomers used in step (i).

Suitable components (A), (B), (C) and (D) have been mentioned above. The reaction conditions mentioned above apply to both step (i) and step (ii).

The reaction product (RP') obtained in step (i) can either be isolated by methods known to those skilled in the art, e.g. by precipitation, with a nonpolar solvent, e.g. hexane, separation, if desired reprecipitation with hexane from a polar solvent, e.g. chloroform, and, if desired, drying, e.g. under reduced pressure, or used directly without further work-up in step (ii).

The addition of an additional initiator is not necessary in step (ii). The reaction product (RP) obtained in step (ii) is isolated by methods known to those skilled in the art, e.g. by precipitation with a nonpolar solvent, e.g. cyclohexane, and if desired, reprecipitation with cyclohexane or another nonpolar solvent from a polar solvent, e.g. chloroform. The isolated reaction product (RP) obtained is preferably dried, e.g. by spray drying or freeze drying.

In a further, preferred embodiment of the process of the present invention, the components (A), (B), (C) and (D) are reacted in one step.

Suitable components (A), (B), (C) and (D) and suitable reaction conditions have been mentioned above.

Preference is given to placing the monomers (A) and (D) in a reaction vessel, particularly preferably in one of the abovementioned organic solvents, and subsequently adding the components (C) and (D). The reaction mixture is subsequently reacted under the abovementioned reaction conditions. The desired reaction product (RP) is generally obtained from the reaction solution by precipitation in a nonsolvent (i.e. a compound in which the reaction product (RP) is insoluble or only slightly soluble) and subsequent dying, e.g. spray dying or vacuum drying.

The process of the present invention thus makes it possible to prepare, depending on the reaction conditions, random copolymers, block or multiblock or gradient (co)polymers, star-shaped polymers, graft copolymers and branched (co)polymers.

Preference is given to obtaining functionalized block copolymers by means of the first preferred embodiment.

The present invention further provides a reaction product (RP) which is functionalized by halogen-containing groups or sulfonyl groups and can be prepared by the process of the present invention. The reaction product (RP) is particularly preferably made up of the abovementioned preferred monomers.

The process of the present invention is very particularly preferably used for preparing polymers (reaction products (RP)) having the following structures:
poly(methyl methacrylate-b-(p-chloromethylstyrene-co-styrene),
poly(methyl methacrylate-co-p-chloromethylstyrene),
poly(dodecyl methacrylate-co-p-chloromethylstyrene),
poly(ethylhexyl acrylate-co-p-chloromethylstyrene),
poly(ethylhexyl methacrylate-co-p-chloromethylstyrene),
poly(hydroxyethyl methacrylate-co-p-chloromethylstyrene),
poly(hydroxyethyl methacrylate-co-methyl methacrylate-co-p-chloromethylstyrene),
poly(hydroxyethyl acrylate-co-p-chloromethylstyrene),
poly(hydroxyethyl acrylate-co-methyl methacrylate-co-p-chloromethylstyrene).

The reaction products (RP) which can be prepared by the process of the present invention are, in particular, suitable as macroinitiators because of their functionalization. They can be used as macroinitiators for any type of reaction in which appropriate functionalization is required. The reaction products (RP) are particularly preferably used as macroinitiators in ATRP (atom transfer radical polymerization) and in cationic polymerization. These polymerization reactions give graft copolymers whose properties can be tailored as a function of the macroinitiator used and of the further grafting reaction and the monomers used therein to obtain particular desired properties.

The present invention therefore also provides for the use of a reaction product (RP) as macroinitiator in the preparation of graft copolymers and provides a process for preparing graft copolymers by reaction of a reaction product (RP) with at least one suitable monomer (component (E)), with the process particularly preferably being a cationic polymerization.

The preparation of graft copolymers by a combination of controlled polymerization in the presence of compounds of the formula (I) to prepare a functionalized macroinitiator and cationic polymerization or ATRP is not known from the prior art.

This combination makes it possible to prepare tailored graft copolymers for numerous applications. In particular, graft copolymers made up of structural units obtainable from polar monomers by free-radical polymerization and structural units obtainable from nonpolar monomers by preferably cationic polymerization can be obtained in this way.

Component E

Suitable monomers are dependent, inter alia, on the process by which grafting is carried out. Preferred processes are ATRP or cationic polymerization. If the desired graft copolymers are prepared by ATRP, it is possible to use all monomers which are usually suitable for ATRP as monomers. Such monomers correspond to the monomers used as component (A) and have already been mentioned above.

If the desired graft copolymers are prepared by cationic polymerization, all monomers which are usually suitable for cationic polymerization can be used as monomers. Suitable monomers include monomers having a sufficiently high nucleophilicity, e.g. olefins, vinyl ethers, styrene and its derivatives, ethers, thioethers, ester, acetals and alkylene oxides. The process of the present invention is preferably carried out using olefins particularly preferably isobutene or mixtures of isobutene with α-olefins or cyclic ethers, particularly preferably tetrahydrofuran (THF), dioxolane (DXL) or dioxane, as monomers (component (E)). Very particular preference is given to using tetrahydrofuran or isobutene.

The preferred preparation of the graft copolymers is usually carried out by cationic polymerization by means of the "grafting from" mechanism in which the monomers are grafted onto the main polymer chain. The cationic polymerization is carried out by methods known to those skilled in the art using the reaction product (RP) as macroinitiator. The cationic polymerization (grafting) is usually carried out by dissolving the reaction product (RP) used as macroinitiator in a polar solvent, e.g. dichloromethane, adding one or more monomers (component (E)) and preferably additionally adding a coinitiator. Suitable coinitiators are Lewis acids such as boron trifluoride, alkylaluminum chlorides, e.g. diethylaluminum chloride, aluminum alkyls, e.g. triethylaluminum or trimethylaluminum, and titanium halides, e.g. TiCl$_4$ or silver perchlorate.

The component (E) is used in a molar ratio to the groups containing halogen or sulfonyl chloride present in the reaction product (RP) used as macroinitiator of generally $10^4$:1 preferably 5000:1, particularly preferably 2000:1.

The initiator efficiency based on the conversion of the groups containing halogen or sulfonyl chloride present in the macroinitiator is generally from 30 to 100%, preferably from 60 to 100%.

The graft copolymers obtained display a slight increase in the molecular weight distribution compared to the corresponding macroinitiators. Nevertheless, a narrow molecular weight distribution is found. The molecular weight distribution of the graft copolymers is preferably ≦2.5, particularly preferably ≦2.

The present, invention further provides graft copolymers which can be prepared by the process of the present invention.

Very particularly preferred graft copolymers which can be prepared by the process of the present invention are poly(methyl methacrylate-b-poly(styrene-co-chloromethylstyrene-g-isobutene)), poly(methyl methacrylate-co-p-chloromethylstyrene-g-isobutene), poly(dodecyl methacrylate-co-p-chloromethylstyrene-g-isobutene), poly(ethylhexyl acrylate co-p-chloromethylstyrene-g-isobutene), poly(ethylhexyl methacrylate-co-p-chloromethylstyrene-g-isobutene), poly(hydroxyethyl methacrylate-co-p-chloromethylstyrene-g-isobutene), poly(hydroxyethyl methacrylate-co-methyl methacrylate-co-p-chloromethylstyrene-g-isobutene), poly(hydroxyethyl acrylate-co-p-chloromethylstyrene-g-isobutene), poly(hydroxyethyl acrylate-co-methyl methacrylate-co-p-chloromethylstyrene-g-isobutene), poly(methyl methacrylate-b-poly(styrene-co-chloromethylstyrene-g-tetrahydrofuran)), poly(methyl methacrylate-co-p-chloromethylstyrene-g-tetrahydrofuran).

poly(dodecyl methacrylate-co-p-chloromethylstyrene-g-tetrahydrofuran), poly(ethylhexyl acrylate-co-p-chloromethylstyrene-g-tetrahydrofuran), poly(ethylhexyl methacrylate-co-p-chloromethylstyrene-g-tetrahydrofuran), poly(hydroxyethyl methacrylate-co-(p-chloromethylstyrene-tetrahydrofuran), poly(hydroxyethyl methacrylate-co-methyl methacrylate-co-p-chloromethylstyrene-g-tetrahydrofuran), poly(hydroxyethyl acrylate-co-p-chloromethylstyrene-g-tetrahydrofuran), poly(hydroxyethyl acrylate-co-methyl methacrylate-co-p-chloromethylstyrene-g-tetrahydrofuran), poly(methyl methacrylate-b-poly(styrene-co-chloromethylstyrene-g-dioxolane)), poly(methyl methacrylate-co-p-chloromethylstyrene-g-dioxolane), poly(dodecyl methacrylate-co-p-chloromethylstyrene-g-dioxolane), poly(ethylhexyl acrylate-co-p-chloromethylstyrene-g-dioxolane).

poly(ethylhexyl methacrylate-co-p-chloromethylstyrene-g-dioxolane), poly(hydroxyethyl methacrylate-co-(p-chloromethylstyrene-g-dioxolane), poly(hydroxyethyl methacrylate-co-methyl methacrylate-co-p-chloromethylstyene-g-dioxolane), poly(hydroxyethyl acrylate-co-p-chloromethylstyrene-g-dioxolane), poly(hydroxyethyl acrylate-co-methyl methacrylate-co-p-chloromethylstyrene-g-dioxolane).

The graft copolymers which can be prepared by the process of the present invention are preferably used as phase compatibilizers, e.g. in polymer mixtures, adhesion promoters, for hydrophilicizing surfaces, as binders for paint and varnish compositions, in coating compositions and in laundry detergents and cleaners.

The copolymers of isobutene which is preferably used as monomer (component (E)), are used, for example, for preparing fuel and lubricant additives, as elastomers, as adhesives or adhesive raw materials, as base constituents of sealants and encapsulation compositions, in coating systems, in particular in those having a barrier action against water vapor, and in chewing gum compositions, Block copolymers of isobutene with vinylaromatic monomers display, in particular, elastomeric properties and a high impermeability to gas, so that they are particularly suitable for applications in which these properties are required.

The following examples illustrate the invention.

EXAMPLES

Materials Used

Methyl methacrylate (MMA), n-dodecyl methacrylate (DDMA), 2-ethylhexyl acrylate (EHA), styrene and p-chloromethylstyrene were purified by passing them through a column of basic $Al_2O_3$ and subsequently distilling them. Diphenylethene (DPE) was distilled before use. Azobisisobutyronitrile (AIBN) was recrystallized from methanol. Isobutene (Linde) was passed through a column of molecular sieves and through a column containing potassium on aluminum oxide. Diethylaluminum chloride (DEAC) (1.0 molar solution in hexane) was used as received. Tetrahydrofuran (THF), dioxane (DXL), dichloromethane and toluene were dried over calcium hydride for 48 hours and subsequently distilled. Silver perchlorate was used as received and stored under argon.

Measurements

The molecular weights and molecular weight distributions were determined using a Waters 510 gel permeation chromatograph with UV (Waters 486) and RI (Waters 410) detectors and, in the case of the two-stage preparation of the reaction product (RP) and cationic polymerization with isobutene, with Showa Denko columns (Shodex K-802.5, K-804, K-805) which were calibrated with a linear polystyrene standard or in the case of the single-stage preparation of the reaction product (RP) and subsequent polymerization with THF or DXL with Polymer Laboratories columns (PLgel 10 μm MIXED B) which were calibrated with linear polystyrene as standard. Chloroform was used as eluant in both cases.

The $^1$H-NMR spectra were measured at 300 K in $CDCl_3$ as solvent using a Bruker ARX 300.

A 2-stage Preparation of the Reaction Product (RP)

A1. Poly(methyl methacrylate)

15 ml (131.28 mmol) of methyl methacrylate were degassed by means of three freezing, pumping and thawing cycles. 70 mg (0.3 mol %) of AIBN and 112.0 μl,(0.45 mol %) of 1,1-diphenylethene (DPE) were subsequently added to the monomer and the mixture was stirred at 80° C. for 2 hours. The polymer obtained (yield: 4.2 g) was precipitated in 300 ml of hexane and reprecipitated from $CHCl_3$ in 300 ml of hexane and subsequently dried under reduced pressure.

A2. Poly(methyl methacrylate-b-(p-chloromethylstyrene-co-styrene))

270 mg (0.015 mmol) of poly(methyl methacrylate) (PMMA), 2 ml (17 mmol) of styrene and 2 ml (14 mmol) of 4-chloromethylstyrene (CMS) were dissolved in 80 ml of toluene. The polymerization was started by heating the mixture to 85° C. After 3 hours, the solution was cooled to room temperature. The polymer was precipitated in 300 ml of cyclohexane and reprecipitated twice from $CHCl_3$ by means of 300 ml of cyclohexane and dried by freeze drying (yield: 380 mg).

The formation of a block copolymer could be demonstrated by the increase in the molecular weight of the PMMA precursor (product from Example A1.) by means of GPC (gel permeation chromatography). A monomodal molecular weight distribution with virtually no residual PMMA is found in the chromatogram, i.e. the formation of the block copolymer is quantitative. The CMS content of the block copolymer is 19 mol %, as determined by $^1$H-NMR spectroscopy and GPC.

B Preparation of a Graft Copolymer Using the Reaction Product from Example A2. as Macroinitiator B1. Poly(methyl methacrylate-b-poly(styrene-co-chloromethylstyrene-d-isobutene))

The graft copolymerizations were carried out in an argon atmosphere at 80° C. with exclusion of oxygen. 5 mg of the reaction product from Example A2. were dissolved in 4 ml of $CH_2Cl_2$ and added to a mixture of 15 ml of hexane and 10 ml of $CH_2Cl_2$ which had been precooled, to −80° C. Defined amounts of isobutene (21 to 84 mmol) were added and the graft copolymerization was started by addition of 6.5 ml (6.5 mmol) of a precooled 0.1 molar diethylaluminum chloride solution in hexane. After one hour, the reaction was stopped by addition of 3 ml of precooled methanol.

Table 1 summarizes the results of the graft copolymerization of the reaction products (macroinitiators) from Example A2. and isobutene.

TABLE 1

| Polymer | $IB_{feed}$ mmol | $M_n$ g/mol | $M_w$ g/mol | PDI |
|---|---|---|---|---|
| PMMA | — | 18 600 | 29 000 | 1.5 |
| P(MMA-b-CMS-co-St) | — | 27 000 | 42 000 | 1.6 |
| P(MMA-b-CMS-co-St-g-IB) | 5 | 57 700 | 109 000 | 1.9 |
| P(MMA-b-CMS-co-St-g-IB) | 10 | 59 300 | 110 000 | 1.9 |
| P(MMA-b-CMS-co-St-g-IB) | 16 | 68 400 | 120 000 | 1.7 |
| P(MMA-b-CMS-co-St-g-IB) | 21 | 73 000 | 133 000 | 1.8 |
| P(MMA-b-CMS-co-St-g-IB) | 26 | 75 500 | 155 000 | 2.0 |

In the table:
$IB_{feed}$ amount of isobutene in mmol
$M_n$ number average molecular weight
$M_w$ weight average molecular weight
PDI polydispersity index [$M_w/M_n$]

From the results determined by means of gel permeation chromatography (GPC), which are summarized in Table 1, it can be seen that the reaction product from Example A2. serves as macroinitiator in the polymerization of isobutene. No transfer reaction can be detected, which is shown by the monomodal distribution and the relatively low polydispersity of the graft copolymers obtained.

C Single-stage Preparation of the Reaction Product (RP)

C1. Poly(meth)acrylate Macroinitiators 47.5 mmol of (meth)acrylate (methyl methacrylate for MI1, dodecyl methacrylate for MI2, ethylhexyl acrylate for MI3) and 3 mmol of CMS were dissolved in 11 ml of toluene and degassed by three freezing, pumping and thawing cycles, 24.6 mg of AIBN and 26.4 μl of DPE were subsequently added to the monomer solution, and the mixture was stirred at 80° C. for one day. The copolymers obtained (yields: MI1: 4.5 g, MI2: 10.3 g, MI3: 6.0 g) were precipitated in 500 ml of methanol and reprecipitated from $CHCl_3$ in 500 ml of ethanol and dried under reduced pressure.

The incorporation of CMS into the polymer was demonstrated by $^1$H-NMR.

D Graft Copolymers

D1. Graft Copolymer GP1

160 mg of MI1, 12 ml (148 mmol) of THF and 40 mg (0.19 mmol) of silver perchlorate were dissolved in 10 ml of dichloromethane and stirred at room temperature for 20 hours. All volatile compounds were subsequently removed under reduced pressure. The product obtained was dissolved in 10 ml of chloroform, filtered and precipitated in 200 ml of methanol. Drying under reduced pressure gave 370 mg of polymer.

D2. Graft Copolymer GP2

260 mg of MI2, 10 ml (124 mmol) of THF and 20 mg (0.096 mmol) of silver perchlorate were dissolved in 10 ml of dichloromethane and stirred at room temperature for 22 hours. The solution was subsequently filtered and precipitated in 206 ml of ethanol. Dying under reduced pressure gave 380 mg of polymer.

D3. Graft Copolymer GP3

520 mg of MI2, 3 ml (42.9 mmol) of dioxolane and 40 mg (0.193 mmol) of silver perchlorate were dissolved in 7.5 ml of toluene and stirred at room temperature for one hour. All volatile components were subsequently removed under reduced pressure. The residue was dissolved in 20 ml of chloroform, filtered and precipitated in 300 ml of ethanol. Drying under reduced pressure gave 3.29 g of polymer.

D4. Graft Copolymer GP4

480 mg of MI3, 10 ml (124 mmol) of THF and 60 mg (0.298 mmol) of silver perchlorate were dissolved in 7.5 ml of toluene and stirred at room temperature for 24 hours. All volatile compounds were subsequently removed under reduced pressure. The residue was then dissolved in 15 ml of chloroform, filtered and precipitated in 300 ml of ethanol. Drying under reduced pressure gave 670 mg of polymer.

D5. Graft Copolymer GP5

700 mg of MI3, 3 ml (42.9 mmol) of dioxolane and 80 mg (0.386 mmol) of silver perchlorate were dissolved in 7.5 ml of toluene and stirred at room temperature for 1 hour. All volatile components were subsequently removed under reduced pressure. The residue was dissolved in 30 ml of chloroform, filtered and precipitated in 400 ml of ethanol. Drying under reduced pressure gave 2.8 g of polymer.

Table 2 shows the molar masses and the benzyl chloride content of the macroinitiators prepared in the examples.

TABLE 2

Characterization of the macroinitiators prepared by a single-stage reaction

| Polymer | Yield | $M_n$ | $M_w$ | PDI | Composition (NMR) |
|---|---|---|---|---|---|
| MI1 | 86.3% | 45 000 | 78 000 | 1.70 | MMA/CMS = 15 |
| MI2 | 82.2% | 69 900 | 99 900 | 1.43 | DDMA/CMS = 21 |
| MI3 | 65.7% | 38 400 | 60 400 | 1.57 | EHA/CMS = 16 |

In the table:
$M_n$ number average molecular weight
$M_w$ weight average molecular weight
PDI polydispersity index ($M_w/M_n$)
Composition: molar ratio of component A to component D, determined by $^1$H-NMR spectroscopy All macroinitiators prepared were active as initiators in the ring-opening polymerization of cyclic ethers in the presence of silver perchlorate as coinitiator. The initiator efficiency, determined by $^1$H-NMR, is from 30 to 100%, based on the benzyl chloride conversion (see Table 3: Characterization of the graft copolymers).

The occurrence of grafting could be confirmed by a rise in the molar masses, determined by gel permeation chromatography (GPC), of the graft copolymers obtained.

A characterization of the resulting graft copolymers by gel permeation chromatography (GPC) and $^1$H-NMR is summarized in Table 3.

TABLE 3

Characterization of the graft copolymers

| Polymer | Initiator efficiency | $M_n$ | $M_w$ | PDI | Composition (NMR) | Composition (gravimetry) |
|---|---|---|---|---|---|---|
| GP1 | 60.1% | 184 000 | 310 000 | 1.70 | MMA/THF 1/1.5 | MMA/THF 1/1.8 |
| GP2 | 100% | 105 000 | 207 000 | 1.98 | DDMA/THF 1/1.1 | DDMA/THF 1/1.6 |
| GP3 | 100% | 73 500 | 134 400 | 1.83 | DDMA/THF 1/16.8 | DDMA/DXL 1/18.4 |
| GP4 | 100% | 40 400 | 103 000 | 2.55 | EHA/THF 1/0.9 | EHA/THF 1/1.4 |
| GP5 | 30.0% | 46 100 | 72 200 | 1.59 | EHA/DXL 1/6.7 | EHA/DXL 1/7.5 |

In the table:
$M_n$ number average molecular weight
$M_w$ weight average molecular weight
PDI polydispersity index ($M_w/M_n$)
Composition: molar ratio of component A to component D determined by $^1$H-NMR spectroscopy or by gravimetry In all cases, the composition determined by gravimetry has a higher polyether content than the composition determined by means of $^1$H-NMR. All graft copolymers are elastomeric, which makes drying difficult. The overestimation of the conversion in the case of gravimetry is thus probably attributable to solvent residues in the polymer.

We claim:

1. A process for preparing a reaction product (RP) functionalized by groups containing halogen or sulfonyl chloride by reaction of the following components under free-radical conditions:
    a) at least one free-radically polymerizable monomer as component (A),
    b) at least one compound of the formula (I) as component (B)

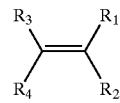

where $R_1$ to $R_4$ are each, independently of one another, hydrogen, an in each case unsubstituted or substituted alkyl radical, cycloalkyl radical or an aralkyl radical or an unsubstituted or substituted aromatic hydrocarbon radical, with the proviso that at least two of the radicals $R_1$ to $R_4$ are unsubstituted or substituted aromatic hydrocarbon radicals or the radicals $R_1$ and $R_2$ or $R_3$ and $R_4$ in each case in pairs are a substituted or unsubstituted aromatic hydrocarbon having from 6 to 18 carbon atoms and bearing a functional group which has a multiple bond between a carbon atom and a heteroatom which is conjugated with the C—C double bond in the formula (I),
    c) at least one free-radical initiator as component (C),
    d) at least one free-radically polymerizable monomer containing halogen or sulfonyl chloride groups as component (D).

2. A process as claimed in claim 1, which comprises the following steps:
    (i) reaction of the components (A), (B) and (C) under free-radical conditions to form a reaction product (RP');
    (ii) reaction of the reaction product (RP') with the component (D) and, if desired, further free-radically polymerizable monomers (component (A)) which are different from the free-radically polymerizable monomers used in step (i).

3. A process as claimed in claim 1, wherein the components (A) to (D) are reacted in one step.

4. A process as claimed in claim 1, wherein at least one free-radically polymerizable monomer selected from the group consisting of styrene, acrylic and methacrylic acid, $C_1$–$C_{10}$-alkyl and -hydroxyalkyl acrylate and -methacrylates, preferably methyl methacrylate; vinyl acetate, substituted or unsubstituted vinylpyrrolidone and mixtures of two or more of the monomers mentioned is used as component (A).

5. A process as claimed in claim 1 wherein at least one compound selected from the group consisting of 1,1-diphenylethylene, alkoxydiphenylethylene, 1,1-dinaphthylethylene, 4,4-vinylidenebis(N,N'-dimethylaniline), 4,4-vinylidenebis (1-aminobenzene), cis-stilbene, trans-stilbene, methyl α-phenylacrylate, methyl α-phenylmethacrylate, α-phenylacrylonitrile, α-phenylmethacrylonitrile and mixtures of two or more thereof is used as component (B).

6. A process as claimed in claim 1, wherein 4-chloromethylstyrene is used as component (D).

7. A reaction product (RP) functionalized by groups containing halogen or sulfonyl chloride which can be prepared by a process as claimed in claim 1.

8. A process for preparing graft copolymers by reaction of a reaction product (RP) as claimed in claim 7 with at least one suitable monomer as component E.

9. A process as claimed in claim 8, wherein the reaction is a cationic polymerization.

10. A process as claimed in claim 8, wherein the monomers (E) are selected from the group consisting of olefins, preferably isobutene or mixtures of isobutene with α-olefins, and cyclic ethers, preferably tetrahydrofuran (THF), dioxolane (DXL) and 1,4-dioxane.

11. A process as claimed in claim 8, wherein Lewis acids such as boron trifluoride, alkylaluminum chlorides such as diethylaluminum chloride, aluminum alkyls such as triethylaluminum or trimethylaluminum, titanium halides such as $TiCl_4$ or silver perchlorate are used as coinitiator.

12. A grafted copolymer which can be prepared by a process as claimed in claim 8.

* * * * *